3,167,539
HYDROXOCOBALAMIN
Ernest Lester Smith, North Harrow, England, assignor to Glaxo Laboratories Limited, Greenford, England, a British company
No Drawing. Filed May 24, 1962, Ser. No. 197,230
Claims priority, application Great Britain, June 16, 1961, 21,904/61
15 Claims. (Cl. 260—211.5)

This invention is concerned with improvements in or relating to the preparation of hydroxocobalamin (vitamin $B_{12b}$).

In the manufacture of cobalamins by fermentation the substance normally produced is cyanocobalamin. It has recently appeared however that hydroxocobalamin may be the substance of choice for medical application so that it has become desirable to manufacture this substance as opposed to cyanocobalamin. The direct production of hydroxocobalamin by fermentation however gives rise to difficulties, particularly with regard to the isolation of the substance from the fermentation medium so that it is preferable first to produce cyanocobalamin and thereafter convert this to hydroxocobalamin.

It has previously been proposed to convert cyanocobalamin to hydroxocobalamin by reduction, either by hydrogenation or by chemical reduction followed by reoxidation, but such methods give rise to relatively poor yields being accompanied by undesirable degradation of the desired substance. It has also been proposed to effect the desired conversion by exposing cyanocobalamin to visible light under slightly acidic conditions accompanied by aeration. This conversion is however slow and unsuitable for application on the commercial scale. Undesirable degradation also tends to take place.

It is thus an object of the present invention to provide an improved process for the conversion of cyanocobalamin to hydroxocobalamin which is convenient to use on the commercial scale and which is attended by less risk of degradation.

We have found that cyanocobalamin can be converted to hydroxocobalamin in improved manner by first converting the cyanocobalamin to sulphitocobalamin, converting the latter to nitritocobalamin which is thereafter converted to the desired hydroxocobalamin. Such conversions can be effected with but little degradation of the cobalamins and in excellent yield. In the result by the use of the present process overall yields of hydroxocobalamin as high as 95% can be obtained.

According to the invention, therefore, we provide a process for converting cyanocobalamin to hydroxocobalamin which comprises reacting the cyanocobalamin with sulphite ions to form sulphitocobalamin which is thereafter reacted with nitrite ions to form nitritocobalamin which is thereafter reacted with a substance decomposing nitrous acid to form hydroxocobalamin.

In the first stage of the present process the cyanocobalamin is preferably reacted with sulphite ions in aqueous media under acidic conditions. Since the interchange of sulphite ions with cyanide ions is a reversible reaction, preferably a considerable excess, e.g. 10 to 30 times (on a molar basis) of sulphite ions is used. Preferably also steps are taken to remove the cyanide ions (as hydrogen cyanide) from the reaction zone upon their release for example, by distillation of the reaction medium or, conveniently by passage of an inert gas therethrough, e.g. air or nitrogen. The reaction can, for example, be effected by treating an aqueous solution of cyanocobalamin with a water soluble sulphite, e.g. an alkali metal sulphite such as sodium or potassium metabisulphite and an acid whilst blowing a vigorous stream of an inert gas therethrough. It is preferable that the pH of the reaction medium should not be less than 1 in order to avoid risk of undesirable degradation and thus the acid used is preferably a weak acid such as a water soluble carboxylic acid. Preferably the pH is within the range of 2 to 4. Suitable acids include particularly aliphatic carboxylic acids, for example, acetic acid, propionic acid etc. A small quantity of a strong acid such as a mineral acid, e.g. hydrochloric or sulphuric acid may be added towards the end of the reaction to ensure completion.

Alternatively the reaction can be effected by passing a stream of sulphur dioxide if desired mixed with an inert gas through an aqueous solution of cyanocobalamin. The conversion of cyanocobalamin to sulphitocobalamin can be completed in from 6 to 8 hours. At the end of the conversion most of the excess sulphur dioxide is preferably removed by blowing a stream of inert gas through the reaction mixture.

The conversion of sulphitocobalamin to nitritocobalamin is again preferably effected in aqueous solution under acid conditions, a pH less than 1 being however desirably avoided. Preferably the pH is maintained between 2 and 4. The reaction can be effected by treatment of an aqueous solution of the sulphitocobalamin with a water soluble nitrite e.g. an alkali metal nitrite such as sodium or potassium nitrite and an acid, preferably a weak acid such as an aliphatic carboxylic acid e.g. acetic acid, propionic acid etc. The proportion of acid used preferably exceeds the proportion of nitrite used on a molar basis.

Alternatively nitrous fumes, generated, for example, by reaction of a nitrite with a strong acid may be passed through an aqueous solution of the sulphitocobalamin. An excess of nitrite ions is preferably used in the reaction. The conversion of sulphitocobalamin to nitritocobalamin can be completed in some 6 to 8 hours. At the end of the reaction when working in acid conditions excess nitrous acid can be removed by blowing an inert gas through the reaction medium.

The conversion of the nitritocobalamin to hydroxocobalamin is effected by reaction with a substance preferably in excess, which decomposes nitrous acid, the reaction being preferably effected in aqueous media under acidic conditions, pH's less than 1 being however desirably avoided; preferably the pH is maintained within the range of from 2 to 4. Urea and sulphamic acid are particularly satisfactory for decomposition of the nitrous acid but other substances which can be used include for example, amines. Sulphamic acid is particularly satisfactory. Since at this stage of the process particularly convenient conditions, especially when using sulphamic acid, tend to be rather strongly acid (e.g. pH 1.5–2.5) it is generally desirable to complete the reaction as quickly as possible, a time of some 2–3 hours being usually sufficient.

The resulting hydroxocobalamin can be recovered and purified as desired. For example, it may be separated from the reaction medium of the third stage by the conventional process of absorption on charcoal followed by elution, e.g. with aqueous acetone or by extraction with aqueous phenol, if desired containing a further solvent such as benzene or carbon tetrachloride followed by re-extraction into an aqueous phase. Alternatively where the third stage of the process has been effected under salt-free conditions the reaction medium can be passed through a basic ion exchange resin, in the base form for the purpose of reducing acidity. Further purification can be effected by subsequent passage through diethylaminoethyl cellulose exchange material which serves to remove undesirable acidic degradation products.

We have found that carboxymethyl cellulose and sulphoethyl cellulose are particularly useful for the purification of hydroxocobalamin, the former being the more convenient. These substances absorb hydroxocobalamin in the free base form from neutral salt-free solutions and subsequent elution e.g. with dilute acid such as dilute hydrochloric acid, gives rise to material of substantially improved purity.

Final crystallisation of the hydroxocobalamin can be effected, for example, from aqueous acetone in conventional manner.

For the better understanding of the invention the following examples are given only as illustrations:

Example 1

0.5 gm. of cyanocobalamin and 1 gm. of potassium metabisulphite were dissolved in 60 ml. of water and 1 ml. of glacial acetic acid was added. Air was blown through the solution vigorously for 6 hours altogether, a second portion of 1 ml. of acetic acid being added half an hour from the start. The solution was left overnight in the refrigerator. Next morning it was warmed to room temperature and 0.25 gm. of sodium nitrite was added. After 2 hours 0.5 gm. of sulphamic acid was added and the solution was allowed to stand a further 2 hours.

It was then extracted with small portions of phenol-chloroform mixture (2:1 w./w.) until substantially all the colour was removed. The combined extracts were washed with about half their volume of 0.05 N hydrochloric acid. The extracts were mixed with about one-third volume of acetone and 3 volumes of ether, and shaken with small portions of water till substantially all the colour was removed. The aqueous extracts were crystallised by adding 12 volumes of acetone. The yield of hydroxocobalamin was 0.46 gm., and a further 0.025 gm. was recovered by adding more acetone to the filtrate.

Example 2

0.5 gm. of cyanocobalamin was dissolved in 25 ml. of water, and a mixture of sulphur dioxide and air was aspirated through the solution. This was accomplished by drawing the air first through a flask containing 2.5 gm. potassium metabisulphite in 50 ml. water to which 4 portions each of 5 ml. of N sulphuric acid were added at half-hourly intervals. After a total of 6 hours aeration, nitrous fumes were drawn through the cobalamin solution, generated from 0.2 gm. sodium nitrite and 5 ml. of N sulphuric acid. The solution was left at room temperature overnight. The following morning 0.1 gm. of sulphamic acid was added and the solution was allowed to stand a further 3 hours.

The basic ion-exchange resin Deacidite FF in the hydroxyl form was added with stirring until the pH rose to 4.5. The filtrate was run through a column of diethyl-aminoethyl cellulose in the hydroxyl form, 5″ in height by 1″ in diameter, followed by distilled water till the effluent was colourless. The effluent was run directly through another column the same size, of carboxymethyl cellulose in the hydrogen form. After washing till the effluent was colourless, the adsorbed hydroxocobalamin was eluted with 0.02 N hydrochloric acid and the product was crystallised by adding 15 volumes of acetone to the eluate. The yield was 0.36 gm.; 0.12 gm. of unchanged cyanocobalamin was recovered from the effluent from the second column.

I claim:

1. A process for converting cyanocobalamin to hydroxocobalamin, which comprises reacting cyanocobalamin in aqueous media with a source of sulphite ions selected from the group consisting of a water soluble sulphite and sulfur dioxide to form sulphitocobalamin, thereafter reacting sulphitocobalamin with a source of nitrite ions selected from the group consisting of a water soluble nitrite and nitrous oxide to form nitritocobalamin and then reacting nitritocobalamin with a substance decomposing nitrous acid selected from the group consisting of urea and sulfamic acid to form hydroxocobalamin.

2. A process for converting cyanocobalamin to hydroxocobalamin which comprises reacting cyanocobalamin in aqueous media under acidic conditions with an alkali metal sulphite to form sulphitocobalamin, thereafter reacting sulphitocobalamin with an alkali metal nitrite to form nitritocobalamin and then reacting nitritocobalamin with sulfamic acid to form hydroxocobalamin.

3. A process as claimed in claim 1 in which a 10- to 30-fold excess of sulphite ions based on the molar concentration of cyanide ions is used.

4. A process as claimed in claim 1 in which the cyanide ions resulting from the reaction are removed from the reaction medium as they are formed by continually removing HCN from the reaction medium.

5. A process as claimed in claim 1 in which the reaction of the cyanocobalamin with the sulphite ions is carried out at a pH of not less than 1.

6. A process as claimed in claim 5 in which said reaction is carried out at a pH of from 2 to 4.

7. A process as claimed in claim 1 in which the reaction of the sulphitocobalamin with nitrite ions is carried out in aqueous solution under acid conditions.

8. A process as claimed in claim 7 in which said reaction is carried out at a pH of from 2 to 4.

9. A process as claimed in claim 1 in which an excess of nitrite ions is used.

10. A process as claimed in claim 1 in which the nitritocobalamin is reacted with an excess of a substance decomposing nitrous acid.

11. A process as claimed in claim 10 in which the hydroxocobalamin is formed at a pH of not less than 1.

12. A process as claimed in claim 11 in which the hydroxocobalamin is formed at a pH of from 2 to 4.

13. A process as claimed in claim 10 in which the hydroxocobalamin is recovered from the reaction medium by absorption on charcoal followed by elution therefrom.

14. A process as claimed in claim 10 in which the hydroxocobalamin is recovered from the reaction medium by extraction with aqueous phenol, followed by re-extraction into an aqueous phase.

15. A process as claimed in claim 10 in which the nitritocobalamin is formed under salt-free conditions and the resulting reaction medium is passed through a basic ion exchange resin and then through diethylaminoethyl cellulose exchange material.

References Cited by the Examiner

UNITED STATES PATENTS 2,721,162   10/55   Fricke _____ 260—211.5

LEWIS GOTTS, *Primary Examiner.*